US012784107B2

(12) United States Patent
Härdle

(10) Patent No.: US 12,784,107 B2
(45) Date of Patent: Nov. 3, 2026

(54) SYSTEM AND METHOD FOR MANAGING AN INVESTIBLE CRYPTOCURRENCY INDEX FUND

(71) Applicant: Royalton Partners AG, St. Moritz (CH)

(72) Inventor: Wolfgang Karl Härdle, Berlin (DE)

(73) Assignee: Royalton Partners AG, St. Moritz (CH)

( * ) Notice: Subject to any disclaimer, the term of this patent is extended or adjusted under 35 U.S.C. 154(b) by 37 days.

(21) Appl. No.: 18/558,897

(22) PCT Filed: May 3, 2022

(86) PCT No.: PCT/IB2022/000253

§ 371 (c)(1),
(2) Date: Nov. 3, 2023

(87) PCT Pub. No.: WO2022/234338

PCT Pub. Date: Nov. 10, 2022

(65) Prior Publication Data

US 2024/0233028 A1 Jul. 11, 2024

Related U.S. Application Data

(60) Provisional application No. 63/183,373, filed on May 3, 2021.

(51) Int. Cl.
*G06Q 40/06* (2012.01)
*G06Q 40/04* (2012.01)

(52) U.S. Cl.
CPC ............ *G06Q 40/06* (2013.01); *G06Q 40/04* (2013.01)

(58) Field of Classification Search
CPC .............................. G06Q 40/06; G06Q 40/04
See application file for complete search history.

(56) References Cited

U.S. PATENT DOCUMENTS 8,335,735 B1 * 12/2012 Chafkin ................ G06Q 40/06 705/36 R
2011/0246390 A1 * 10/2011 Yang ..................... G06Q 40/06 705/36 R (Continued)

FOREIGN PATENT DOCUMENTS

KR 20200007271 A 1/2020
WO WO 01/037168 * 5/2001 ............ G06F 17/60

(Continued)

OTHER PUBLICATIONS

Trimborn et al. : CRIX or evaluating Blockchain based currencies, Oct. 15, 2015, Humboldt University, Berlin, Germany, SFB 649 Discussion Paper 2015-048, pp. 1-9. (Year: 2015).*

(Continued)

*Primary Examiner* — Bijendra K Shrestha
(74) *Attorney, Agent, or Firm* — Buchanan Ingersoll & Rooney PC

(57) ABSTRACT

An algorithmic index system for cryptocurrencies in which the index algorithm, the operation of which is variable based on values input by one or more data sources of various algorithm parameters, are encoded and stored within a file structure. These data serve as a basis for the index displayed. A method of updating the index algorithms and constituent algorithm parameters is also described.

18 Claims, 5 Drawing Sheets

(56) References Cited

U.S. PATENT DOCUMENTS

| | | | | |
|---|---|---|---|---|
| 2019/0295177 | A1* | 9/2019 | Parker, Jr. | G06Q 40/06 |
| 2023/0011788 | A1* | 1/2023 | Wong | G06Q 20/20 |

FOREIGN PATENT DOCUMENTS

| | | | | |
|---|---|---|---|---|
| WO | WO-2015095855 A1 * | 6/2015 | | G06Q 40/06 |
| WO | WO-2019213311 A1 * | 11/2019 | | G06N 99/005 |

OTHER PUBLICATIONS

Hardle et al. CRIX sn index for cryptocurrencies, 2018, Journal of Empirical Finance, 49, pp. 107-122. (Year: 2018).*
Xinwen et al.: A Machine Learning Based Regulatory Risk Index for Cryptocurrencies, Aug. 9, 2020, Econostor, pp. 1-38 (Year: 2020).*
Ni et al.: A Machine Learning based Regulatory Risk Index for Cryptocurrencies, Aug. 24, 2021, pp. 1-37 (Year: 2021).*
Bailey et al., "The Sharpe Ratio Efficient Frontier", downloaded from https://ssm.com/abstract=1821643, Apr. 2012, 36 pages.
"CoinGecko", downloaded from https://www.coingecko.com, Dec. 1, 2023, 10 pages.
"CoinMarketCap" downloaded from https://coinmarketcap.com, Dec. 1, 2023, 12 pages.
International Preliminary Report on Patentability for International Application No. PCT/IB2022/00253, dated Oct. 24, 2023, 10 pages.
International Search Report and Written Opinion for International Application No. PCT/IB2022/00253, dated Aug. 26, 2022, 13 pages.
Ni et al., "A Machine Learning Based Regulatory Risk Index for Cryptocurrencies", Sep. 28, 2020, downloaded from arxiv.org/pdf/2009.12121.pdf, 37 pages.
Chen S. et al., "Econometric Analysis of a Cryptocurrency Index for Portfolio Investment", Handbook of Blockchain, Digital Finance, and Inclusion, vol. 1, Chapter 8, (month unknown 2018), pp. 175-206.
Chen S. et al., "A First Econometric Analysis of the CRIX Family", SFB 649 Discussion Paper 2016-031, (Aug. 30, 2016), Humboldt-Universität zu, Berlin, 47 pages.
Chen Y. et al., "Lead Behaviour in Bitcoin Markets", Risks, (month unknown 2020) vol. 8(4), pp. 1-14.
Chen, C et al., "Pricing Cryptocurrency Options: The Case of CRIX and Bitcoin", International Research Training Group 1792 Discussion Paper 2018-004, Humboldt-Universität zu Berlin, Germany, (month unknown 2018), 34 pages, downloaded from https://www.thecrix.de/references.
CRIX Crypto Index, The Wayback Machine—https://web.archive.org/web/20210421161332/https://thecrix.de/ (Apr. 2021), 3 pages.
Elandner et al., "The Cross-Section of Crypto-Currencies as Financial Assets", Handbook of Blockchain, Digital Finance, and Inclusion, vol. 1, Chapter 7, (month unknown 2018), pp. 145-173.
Elendner et al., "The Cross-Section of Crypto-Currencies as Financial Assets: An Overview", SFB 649 Discussion Paper 2016-038, (Oct. 3, 2016), Humboldt-Universität zu Berlin, 35 pages.
Hardle et al., "CRIX or Evaluating Blockchain-Based Currencies, Oberwolfach Meeting on the Mathematics and Statistics of Quantitative Risk Management", (Sep. 20-26, 2015), Report No. 42/2015, 47 pages.
Hardle et al., "Editorial: Understanding Cryptocurrencies", Journal of Financial Econometrics (Jul. 30, 2020), vol. 18 (2), 36 pages.
Hou AJ et al., "Pricing Cryptocurrency Options", Journal of Financial Econometrics (Apr. 1, 2020), vol. 18(2): 250-279.
Hou, AJ et al., "Pricing Cryptocurrency Options: The Case of Bitcoin and CRIX", (Jun. 11, 2019), 46 pages.
Introductory Slides, CRIX, The Crypto Index, (Apr. 6, 2019), 48 pages.
Kim et al., "VCRIX—a volatility index for crypto-currencies", (rev: Aug. 27, 2021), 39 pages, Available at SSRN 3480348, downloaded from https://www.thecrix.de/references.
Pele et al., "A Statistical Classification of Cryptocurrencies", Available at SSRN 3548462, (Last revised: Apr. 13, 2020), 38 pages.
Petukhina et al., "Investing with Cryptocurrencies—evaluating their potential for portfolio allocation strategies", (Oct. 22, 2020), 64 pages, Available at SSRN 3274193, https://papers.ssrn.com/sol3/papers.cfm?abstract_id=3274193.
Royalton CRIX Crypto Index, Methodology, The Wayback Machine—https://web.archive.org/web/20220519023640/https://www.royalton-crix.com/methodology, (May 2022), 2 pages.
Trimborn et al., "CRIX an Index for Blockchain Based Currencies", SFB 649 Discussion Paper 2016-021, (Nov. 3, 2016), Humboldt-Universität zu Berlin, 27 pages.
Trimborn et al., "CRIX an Index for Cryptocurrencies", (Sep. 22, 2020), 36 pages, downloaded from https://www.thecrix.de/references.
Trimborn et al., "Investing with Cryptocurrencies—A Liquidity Constrained Investment Approach", SFB 649 Discussion Paper 2017-014, Humboldt-Universität zu Berlin, (Jul. 7, 2017), 29 pages.
Trimborn, "Towards Cryptocurrency Index—Analysis of the Market", Master's Thesis, (Mar. 30, 2015), Humboldt Universität zu Berlin, 50 pages.
Trimborn et al., "Investing with Cryptocurrencies—A Liquidity Constrained Investment Approach", (May 25, 2018), 37 pages.
Trimborn et al., "Discover Regional and Size Effects in Global Bitcoin Blockchain via Sparse-Group Network AutoRegressive Modeling", (Feb. 11, 2021), pp. 1-38.
Trimborn et al., "Informative Effects of Expert Sentiment on the Return Predictability of Cryptocurrency", (Aug. 4, 2021), 81 pages.
"Royalton CRIX Crypto Index launches" (Jan. 26, 2022) The Wayback Machine—https://web.archive.org/web/20220813213255/https://www.royalton-partners.com/royalton-crix-crypto-index-launches/, 1 page.

* cited by examiner

SYSTEM AND METHOD FOR MANAGING AN INVESTIBLE CRYPTOCURRENCY INDEX FUND

CROSS-REFERENCE TO RELATED APPLICATIONS

This application is a U.S. national phase application of International Application No. PCT/IB2022/000253, filed May 3, 2022, claiming priority from U.S. Provisional Application Ser. No. 63/183,373, filed May 3, 2021, titled SYSTEM AND METHOD FOR MANAGING AN INVESTIBLE CRYPTOCURRENCY INDEX FUND, incorporated herein by references in its entirety.

BACKGROUND OF THE INVENTION

The cryptocurrency market is unique on many levels: It is very volatile, has a frequently changing market structure, where new cryptoassets (CAs) emerge and vanish on a daily level. For FIAT currency markets, the International Monetary Fund (IMF) offers the index SDR. Prior to the Euro, the ECU index represented the development of European "fiat" currencies. In general, index providers decide on a fixed number of index constituents that represent the market segment. It is a technical challenge to fix a number and develop systemic rules for the constituents in view of market changes. In the frequently changing CA market, given the plethora of potential assets, this challenge is even more severe.

An intuitive choice of index constituents would typically consider a large number of constituents in order to represent the underlying market well. Conversely, financial practice has shown that smaller indices are often preferred. Given the rapidly evolving nature of many CAs in conjunction with possible liquidity problems for smaller index candidates, the necessity for a tradeoff is evident.

Bitcoin is the most popular CA and has the most market capitalization, but hundreds of other CAs are emerging or "dying" each day. The diversified nature of the CA market makes the inclusion of a wide market representation in the index product critical to improve tracking performance. We have shown that assigning optimal weights to these constituents help reduce tracking errors of CA portfolios, despite the fact that the individual market caps and collectively, are much smaller relative to Bitcoin.

Additionally, other types of markets, and in particular nascent and comparably illiquid markets with many potential constituents, may have similar characteristics to that of the cryptocurrency market and may benefit from systems and methods suitable for managing a cryptocurrency index fund. In particular, indices relating to emerging asset types in which the markets are still in a period of transition and unstable may benefit from the management methods and systems as described herein.

SUMMARY OF THE INVENTION

One aspect of the invention includes a computer-implemented method of managing an investible cryptocurrency asset (CA) index that tracks a subset of component eligible cryptocurrencies within a desired tracking error of a total market index (TMI) of eligible CAs. The tradeoff between subset size and tracking error is balanced and optimized by an implementation of a statistical method. The method includes identifying, using the computer processor, a universe of CAs available for investment for which trading data is available from a one or more predetermined data sources. The computer processor filters the universe of CAs using one or more liquidity criteria and one or more reputability criteria to define a set of eligible CAs meeting the liquidity criteria and the reputability criteria. The computer processor ranks the set of eligible CAs from most market capitalization to least market capitalization to define a list of ranked, eligible cryptocurrencies. The computer processor constructs the TMI at a time t; and using formulae [2]-[7] (discussed herein later), iteratively constructs a plurality of cryptocurrency index candidate indices for an increasing number of constituents selected from the list of ranked, eligible cryptocurrencies, starting with a first block of the n highest ranked cryptocurrencies in a first iteration, and adding a next n highest ranked cryptocurrencies in each successive iteration. A commercial embodiment of the invention is known as the CRIX® cryptocurrency index, operated by the Applicant of this application. As used herein, embodiments of the invention may be referenced by its brand name, without prejudice to the claim of trademark rights, and without limitation of the invention to any particular commercial embodiment. For each iteratively-generated CRIX candidate index, the computer processor computes a difference between index log-returns of the total market index (TMI) and the CRIX candidate index, computes its probability density by means of a kernel density estimator, derives an Akaike information criterion (AIC) value using formulae [14]-[17]; and evaluates each CRIX candidate index versus the TMI using an information criterion, such as AIC or Bayesian information criterion (BIC), in accordance with formulae [8]-[11]. The constituents of the investment CRIX index are chosen as those ones, which satisfy the CRIX Technology Decision Criterion (CTDC). For the calculation of the CTDC at time t, the daily AIC values of the last 6 months are approximated by a polynomial, whose degree itself is chosen as that one which minimizes the AIC of possible candidates, being degree one to twenty. The CTDC thus yields a stable and identifiable minimum of the polynomial fit. This CTDC minimum determines the amount of constituents to represent the TMI. They are sorted by market capitalization in descending order and weighted by market capitalization.

The investment CRIX index having selected constituents each having a selected weighting, and using the investment CRIX index with the selected constituents for a first period Q and with the selected weighting for a second period M, wherein M<Q. The computer processor rebalances weighting of the selected constituents in the investment CRIX index periodically each period M, and re-performs the steps of constructing the TMI through selecting the CRIX constituents periodically each period Q to select a new investment CRIX index. The process further comprises transmitting information including the index value for display on a screen, and may further include transmitting information comprising weighting and constituent information to an investment vehicle management computer processor for managing an investment vehicle based upon the index.

The investment fund computer processor conducts the steps of issuing a plurality of shares in the investment fund; receiving funds from one or more investors for each share in the investment fund; and investing funds received from the one or more investors by purchasing the selected constituent cryptocurrencies in amounts consistent with the selected weighting.

The one or more predetermined data sources may comprise a plurality of selected aggregators or exchanges, such as exchanges selected from the group consisting of: Gemini, Kraken, Coinbase®, iBitt™, and Bitstem™ or data aggregators such as: CoinGecko® or CoinMarketCap® or Lukka Prime®. The plurality of selected aggregators or exchanges may comprise 5 exchanges or aggregators.

The reputability criteria may include the CA being active in one or more tradable markets listed on at least three of the exchanges for an entire period since a previous index reconstitution. The liquidity criteria may include the CA having an average daily trading volume in a U.S. Dollar (USD) pair conducted across the plurality of selected aggregators or exchanges above the 25th percentile of the average daily trading volume distribution of all coins traded in the plurality of exchanges. The liquidity criteria may include the CA having free-floating pricing not pegged to a value of any other asset, such as wrapped, leveraged, de-levered, derivative, synthetic, rebased or stable CAs. CAs may further be excluded due to their association to a sector, such as Asset-Securities, Tokenized Real Assets, Tokenized Cryptocurrency Assets, Stablecoins, Tokenized Financial Instruments. The method may include storing data used in the index after each of data transformation step. The method may include retrieving the stored data using an application programming interface (API).

Another aspect of the invention comprises a computer system configured to perform the method as described herein. The computer system comprises a processor connected to an interface of each of the one or more predetermined data sources and to a computer memory structured to hold a database. The processor is configured to import data through the interface and is configured to transform the imported data in accordance with the method steps as described and to store the transformed data in the database after one or more of the data transformation steps. The import is managed in periodic (e.g. monthly) batches in order to stay within memory limits and to ensure reproducibility. The imported data may be cleaned in accordance with the stated requirements. The data may be stored in a local relational database, such as (My)SQL, in order to facilitate requests, apply functions and to store results. Parts of the computer system may be processed in parallel. Monthly backups can be taken, such as in form of a "(My)SQL-dump", or csv files. Backups may be stored on trustworthy third-party servers.

Yet another aspect of the invention comprises computer readable media programmed with language readable by a processor, for causing the processor to carry out the method steps as described herein.

DETAILED DESCRIPTION OF THE INVENTION

Figure 1:
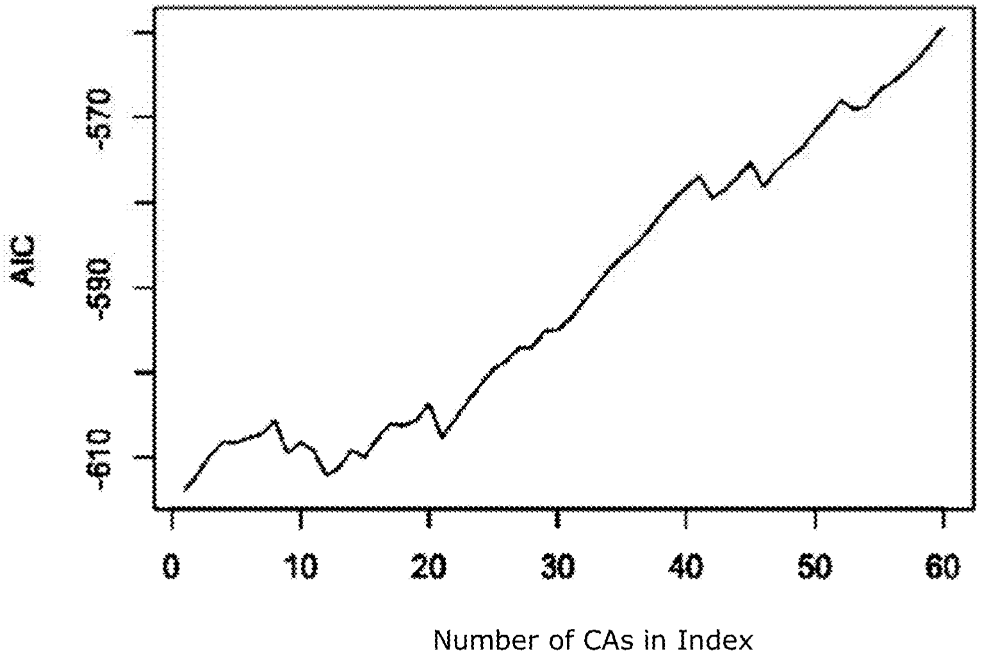
FIG. 1 is a graph depicting AIC versus number of CAs in the CRIX index using data from a timespan Jan. 1, 2019-Oct. 14, 2020.

An academically proven and technically stable ecosystem relying on the Akaike Information Criterion (AIC) is proposed to quickly react to market changes and therefore enable creation of an index for the CA market. An exemplary embodiment of the index as referred to herein is known as the CRIX™ index. For brevity and consistency, the term CRIX may be used herein without trademark markings, but should at all times be understood to refer to an embodiment in which Applicant claims proprietary trademark rights. It should also be understood that while certain aspects of CRIX index have been disclosed and certain embodiments of the CRIX index have been in experimental academic use by the inventors and embodied in an academically published online index value prior to the filing date of this application, certain aspects surrounding the mathematical method as described herein have not been disclosed and/or have not been in use at all or more than a year before the filing date of this application. These aspects have been introduced to transform previously published conceptual CRIX model to become an investable market index to be implemented in live financial transactions. The CRIX index has not previously been used as a basis for managing an investable index, which may be used as a benchmark for an investment vehicle that accepts funds from private investors and invests those funds in accordance with the allocations of the index. Finally, it should be understood that the algorithms as described herein are embodied as instructions readable by a computer processor, and that computer systems specially programmed with such machine-readable language are used for performing the steps of the method as described and claimed herein.

In exemplary embodiments, the constituents that comprise the CRIX index are chosen by model selection such that the constituents represent the market well. In embodiments, the CRIX index is a market index that generally follows the Laspèyres construction, which is e represented as:

$$CRIX_t = \frac{\Sigma_i P_{it} Q_{i0}}{\Sigma_i P_{i0} Q_{i0}} \quad [1]$$

where $P_{it}$ is the price of asset i at time t and $Q_{i0}$ the quantity of asset i at time 0 (the base period). The CRIX index is a slight modification, wherein $$CRIX_t = \frac{MV_{i,t}}{\text{DIVISOR}_t} \quad [2]$$

where $MV_{i,t}$ is the market capitalization of a CA at time t. The Divisor ensures that the changes are stable. In embodiments, the CRIX Divisor is $$\text{Divisor}_0 = \frac{\Sigma_i MV_{i0}}{1000} \quad [3]$$

the starting value of the CRIX index is therefore 1000. Whenever the number of CAs used in the CRIX changes, the Divisor is adjusted. This ensures that changes in the CRIX index are caused solely by price changes.

$$\frac{MV_{i,t-1}}{\text{Divisor}_{t-1}} = \text{INDEX}^{CRIX}_{t-1} = \text{INDEX}^{CRIX}_t = \frac{MV_{i,t}}{\text{Divisor}_t} \quad [4]$$

where $\text{Divisor}_t$ is the Divisor before the change in the amount of coins and $\text{Divisor}_{t-1}$ is the Divisor directly afterwards.

An index with weighted averages may be represented by:

$$CRIX(k)_t = \frac{\sum_i^k MV_{it} \cdot AW_{it}}{\text{Divisor}} \quad [5]$$

where:

$$AW_{it} = \frac{CW_{it}}{W_{it}} \quad [6]$$

where $CW_{it}$ is the capped weight, and $$W_{it} = \frac{MV_{it}}{\Sigma_t MV_{it}} \quad [7]$$

is the weight the CA i would normally have in CRIX index. In some embodiments, the weight may be capped if a single CA i would have an influence of 50% or more in CRIX. For example, this cap may be part of the index rules if analysis of the trading volume shows that Bitcoin has a major influence in the market even though its trading volume, relative to all outstanding Bitcoins, is much lower than for alternative CAs. This implies a higher interest of interested parties in altcoins than their market value suggests, which motivates to lower the influence of Bitcoin.

The universe of data for use in the CRIX index may have some additional criteria applied to identify eligible altcoins for consideration. Specifically, given the nature of the crypto market, some crypto currencies having a high market capitalization, but are not traded frequently. Two exemplary measures that may be applied, which are modified versions of exemplary liquidity rules, are the following:

1. $25^{th}$ Percentile of Average Daily Traded Volume (ADTV) $ADTV_i \geq ADTV_{0.25}$ where $ADTV_{0.25}$ is the $25^{th}$ percentile of the ADTV distribution of all CAs in the last period and $ADTV_i$ is the ADTV of a single CA.
2. $25^{th}$ Percentile of Average Daily Traded Coins (ADTC) $ADTC_i \geq ADTC_{0.25}$ where $ADTC_{0.25}$ is the $25^{th}$ percentile of the ADTCs of all CAs in the last period and $ADTC_i$ is the ADTC of a single crypto.

In an exemplary embodiment, if a CA fulfils at least one of the two rules, it may be considered eligible for being one of the CRIX set of constituents. Another eligibility rule may be to consider only those CAs offered by a limited number of custodians, which the managers of the index fund have vetted and have determined to be reputable. Limiting CAs to those only offered by reputable custodians ensures that the index is replicable by a regulated market participant.

In another embodiment, to ensure that a minimum standard in liquidity/trading volume, security, credibility, exchangeability, and fungibility, the following inclusion criteria are established:

1. Have active tradable markets listed on at least three Aggregators and/or Core Exchanges for the entire period since the previous index reconstitution. This group of data providers includes places like CoinGecko, Coinmarketcap, as well as Gemini, Kraken and Coinbase.

2. To be considered for entry to the Index at any index reconstitution, the average daily trading volume of an asset in the USD pair conducted across all core exchanges shall lie above the $25^{th}$ percentile of the average daily trading volume distribution of all coins traded in the core exchanges.

3. Have free-floating pricing (i.e., not be pegged to the value of any asset).

In the foregoing embodiment, only if all three criteria are fulfilled, is an asset considered eligible.

The number of constituents in the CRIX index is determined by the Akaike Information Criterion (AIC) and Bayesian Information Criterion (BIC) applied to the top X (ranked by market capitalization) CAs in the pool of eligible CAs as filtered by the criteria discussed above. First, the CRIX formula for the total market (or eligible CAs) is calculated. Next, several indices with different numbers of constituents are computed. The number of constituents is then determined by the AIC and BIC criteria. A graph of AIC vs. number of constituents over an exemplary time period is depicted in FIG. 1.

BIC may be used to decide how many CAs shall participate in a representative proxy of the market. The CRIX index is considered an optimal benchmark, if the number of constituents is optimal. For this purpose, the exemplary method includes performing a comparison of the difference between the total market (all market participants) and several candidate indices.

The total market is represented by an index of all market participants, which is computed by the formulae [5], [6] and [7]. The candidate indices, CRIX(k)j, have different numbers of constituents which fulfill $k_1<k_2<k_3$, etc.

$$\varepsilon_{j,t} = \text{total market}_t - CRIX(k)_{j,t}, \quad [8]$$

where CRIX(k)j,t is the CRIX version j with $k_j$ constituents and $\varepsilon_{j,t}$ is the respective difference.

$$\hat{\varepsilon}(k_i, \beta)_t \text{ and } \hat{\varepsilon}(k_1, 1)_t \quad [9]$$

The BIC criterion evaluates the differences, $\varepsilon_{j,t}$ between the candidates and the total market with the respective likelihood $L_j$:

$$L_j = \prod_t f_j(\varepsilon_{j,t}), \quad [10]$$

where $f_j$ represents the density of the $\varepsilon_{j,t}$ over all t. It penalizes $L_j$ with the amount of constituents, $k_j$, such that the following formula results:

$$BIC_j = -2\log L_j + k_j \cdot \log(n_j) \quad [11]$$

where $n_j$ is the number of observations. The density $f_j$ is estimated non-parametrically with a Gaussian kernel. Because the same data are used to estimate $f_j$ and the $BIC_j$, a "leave-one-out" cross-validation procedure is performed to overcome the bias. The search for the optimal model terminates at level j whenever:

$$BIC_{j-1} < BIC_j. \quad [12]$$

Figure 2:
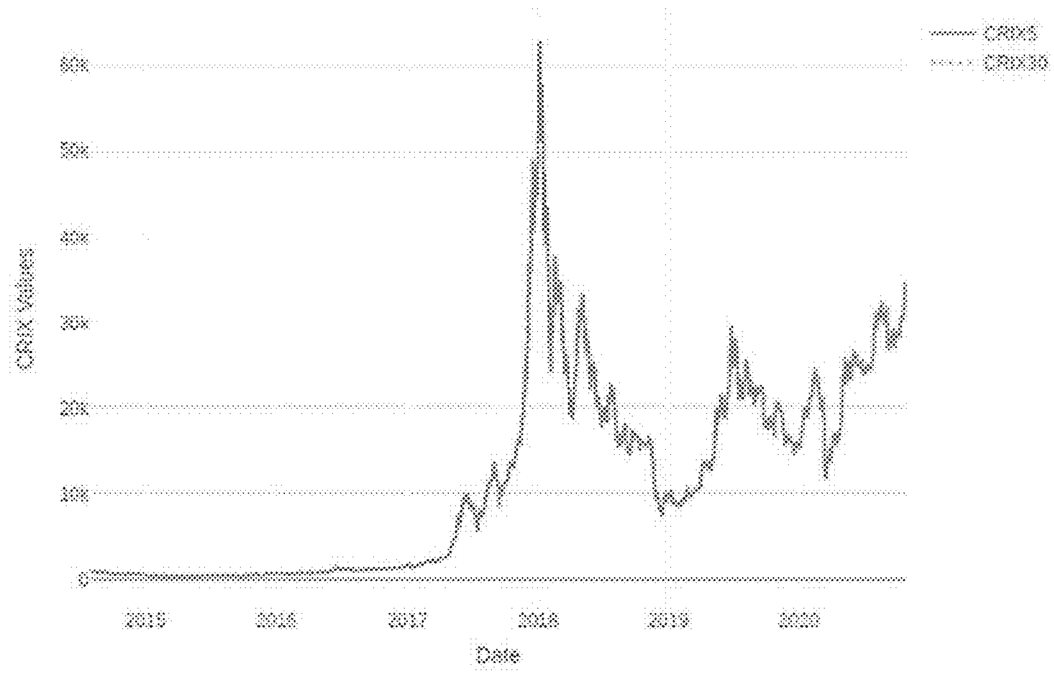
FIG. 2 is a graph depicting value of a CRIX index with 5 constituent CAs (CRIX5) and a CRIX index with 30 constituent CAs (CRIX30) over time.

An exemplary graph of CRIX values for a CRIX index having 5 CA constituents (CRIX5) alongside a CRIX index having 30 constituents (CRIX30) over time, as depicted in FIG. 2 shows a perfect correlation, thereby illustrating that a relatively small number of CAs collectively having the most market cap can be used to effectively track the performance of a much larger (6×) group of CAs.

An exemplary method thus includes the following steps for creating a CRIX Technology Decision Curve (CTDC):

1. Construct the Total Market Index (TMI) at time t: TMIt ($k_{max}$)
2. Set i=2.
3. Construct CRIX ($k_1$,1) and CRIX ($k_i$, β), where $k_1<k_2<k_3<\ldots$
4. Compute difference of TMI and candidate index log-returns.
5. Kernel density estimation for density, where $$f(\hat{\varepsilon}(k_i, \beta)_t) \text{ and } f(\hat{\varepsilon}(k_1, 1)_t) \quad [13]$$

with leave-one-out cross validation.

6. Calculate Akaike Information Criterion on a specific time t:

$$AIC(k_i, \beta, s) = -2\log \prod_{i=1}^{n} f(\hat{\varepsilon}(k_i, \beta)_t) + 2s \text{ and } AIC(k_1, 1, 0) \quad [14]$$

7. If i=($k_{max}$−$k_1$)/$k_1$, then stop; else jump to 3 and i=i+1, where:

$$TMI_t(k_{max}) = \frac{\sum_{i=1}^{k_{max}} MV_{i,t}}{\text{Divisor}} \quad [15]$$

and $k_{max}$ is the maximum number of CAs with available prices.

$$\beta_{i,t} = \frac{Vol_{i,t}}{MV_{i,t}} \quad [16]$$

is the market capitalization weighting factor and $$s \in [0, k_{max} - k_1] \quad [17]$$

Each crypto in CRIX is weighted with its market capitalization.

8. Once at least 6 months of AIC values exist: Calculate CTDC. Fit a polynomial through the data points of the last 6 months of AIC values. Select that polynomial among all candidates, from order 1 to 20, which has the lowest AIC. The minimum of the polynomial fit determines the optimal amount of constituents k.

Thus, in an exemplary method, the universe of CAs (currently approximately 4000 in number) is first filtered to identify eligible CAs by using liquidity and reputability criteria, then combinations of the top X CAs (e.g. 5, 10, 15, or in smaller increments, e.g. 5, 7, 9) are evaluated using the formulas as discussed above, and the AIC and BIC criteria are used for determining the number of constituents in the CRIX index. By contrast, prior art CA indices have been based on a fixed, unchanging number of constituents.

In one embodiment of the method, the number of constituents may have a cap or a fixed number, which cap or fixed number may be determined by interactive input via a user interface on a computer specially programmed with the instructions for performing the method as described herein.

Reallocation

The weightings in the index may be reallocated periodically, such as monthly. Accordingly, in one embodiment, at the beginning of each 1 month period, which may or may not be a calendar month, the liquidity may be rechecked, and the weights of the constituents may be recalculated.

The number of constituents may also be evaluated periodically, preferably less frequently than the period for reallocation of weightings, such as quarterly (e.g. every 3 months). Thus, in an exemplary embodiment, weightings are reallocated on a period of M, and the number of constituents is reallocated on a period of 3M, wherein M=1 month.

Special Events

If the current price for a CA in CRIX index is not available on the predetermined reputable exchanges and data aggregators, the index is insensitive to this particular asset.

If a CA contained in the CRIX index vanishes, it is excluded from the index at the next reallocation date.

Statistical tests for outliers are used in order to verify the data. They specifically target exchange APIs, which return no trading volume, trading pairs where the price exceeds the Median Absolute Deviation, and any price exceeding 100 times the previous price. CAs may be required to have a daily data point for some variables, such as price, volume, market capitalization.

Inconsistent data feeds may cause responsible exchanges to be blacklisted or data providers to be switched or CAs to be blacklisted.

Figure 3:
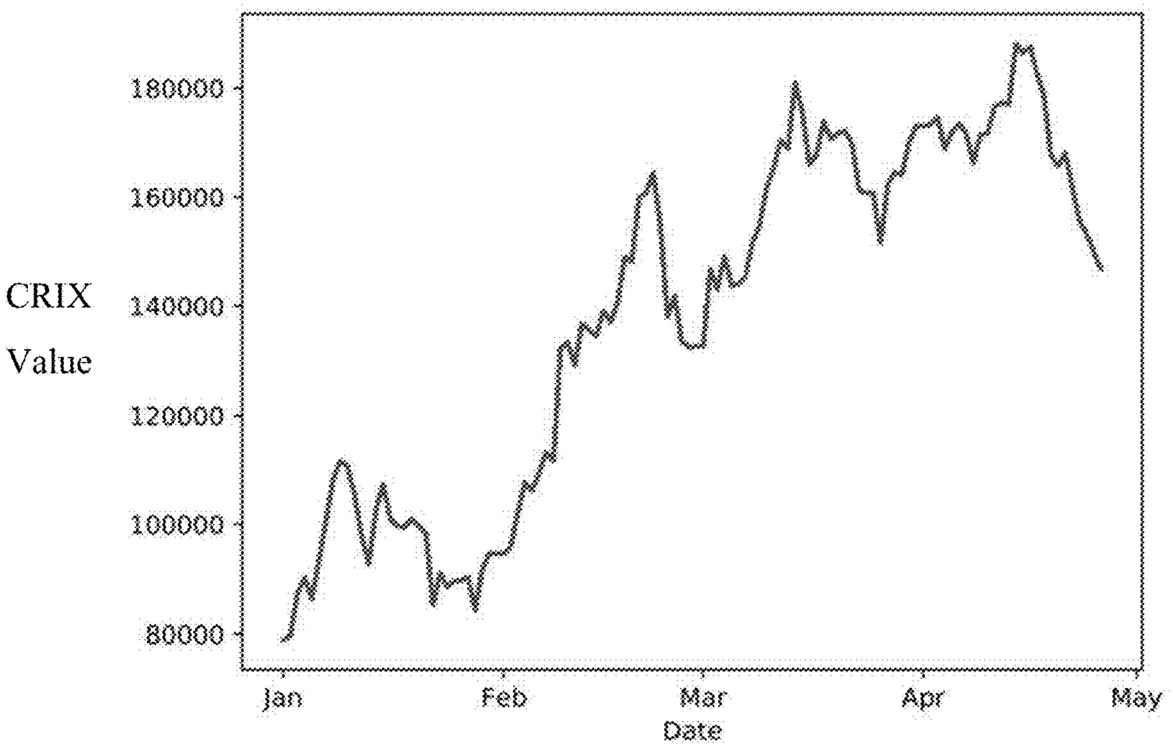
FIG. 3 is a graph depicting the CRIX index using only select CAs.

Additionally, data on crypto asset's price, volume and date may be collected from a set of reputable core exchanges by accessing their respective API's. Multiple data sources may be used to verify the data input of any one, in order to retrieve a list of reputable CAs that are possible candidates for the CRIX. FIG. 3 shows a graph of the subject index only allowing reputable CAs for a number of constituents showing almost no difference in the index levels from 1 to 40 constituents (i.e. FIG. 3 depicts 40 curves here with no statistically significant difference). Furthermore, a liquidity constraint may be employed similar to what is employed by the NASDAQ NCI (i.e. trading volume must be >0.5%

Bitcoin volume and must be greater than the 0.25 percentile of Bitcoin volume, using median values and a lookback window of 40 days.

In an exemplary embodiment, data regarding a CAs price, volume, market capitalization and the respective date associated with the data may be collected from one or more predetermined aggregators, such as but not limited to CoinGecko (see, e.g., www.coingecko.com) and CoinMarketCap (see, e.g., www.coinmarketcap.com). Aggregators, as their name implies, aggregate data reported from a plurality of exchanges. Exchanges, such as Gemini, Kraken, Coinbase, iBitt, and BitStem, facilitate the purchase, redemption, and exchange of CAs for one another or for fiat currencies. In one exemplary embodiment, data from five aggregators or exchanges (e.g. CoinGecko, CoinMarketCap, Gemini, Kraken and Coinbase) may be used. Notably, some exchanges may have only some of the data. For example, CoinGecko has historically been the only aggregator reporting market capitalization information. The data may be collected from the exchanges via an application programming interface (API). The exchanges may employ various reputability algorithms to ensure data integrity. For example, CoinGecko uses a "Trust Score" that may play an important role. Web traffic statistics of the crypto exchanges are checked by a third party (SimilarWeb). Bid-Ask Spreads and 2% order book depth are checked as well as the overall trading volume and frequency. Hence, the Trust Score is updated frequently and depends on market conditions. Coins with a low Trust Score are excluded.

The price feeds are received continuously, and the responsible exchanges do not stop trading regularly. For each CA, the price is calculated as a globally volume-weighted average price among different eligible exchanges. It relies on the 24-hour-volume of the trading pair as declared by the exchanges. The exact formula can be retrieved via www.coingecko.com/en/methodology, incorporated herein by reference. The market capitalization is calculated as the product of the weighted average price and available supply of the regarded CA.

Statistical tests for outliers also may be used to verify the data. Specifically, target exchange APIs that return no trading volume, trading pairs where the price exceeds the Median Absolute Deviation, and any price exceeding 100 times the previous price, may be excluded as outlier data.

Inconsistent data feeds may cause responsible exchanges to be blacklisted as not "reputable" for use in constructing the data from which the CRIX index is compiled.

Additionally, data on a CAs price, volume and date is collected from a set of reputable core exchanges by accessing their respective API's, e.g. Coinbase and Kraken. This data is used to verify CoinGecko's data input and in order to retrieve a list of reputable crypto assets, which are possible candidates for the CRIX. Data from the reputable exchanges of Kraken and Coinbase correlate to data from CoinGecko. Reputability of the exchanges may be conferred by federal, state, independent third party, and/or internal regulations that enhance reputability. Thus, certain regulated exchanges may be considered particularly reputable, and preferred embodiments of the invention may include consideration of date from only such regulated exchanges.

In general, exemplary predetermined exchanges considered for use have the following fundamental characteristics:

- Maintenance of AML controls
- A clear and dependable API that offers current and past trading information
- Trading fees and incentives structured not to obstruct supply and demand
- Accredited by a public supervisory authority
- Consistent vigilance against trade manipulation and errors
- Compliance with supervisory authorities Data Rounding The index numerator and divisor may each be rounded to a predetermined number of decimal places (e.g. 2, in an exemplary embodiment). Index numerator is rounded to two decimal places. Weights are rounded to two decimal places.

Stress Events

In case the API for the chosen exchanges are all simultaneously temporarily unavailable, the algorithm may take the last data saved and use it for calculation. The script may run multiple times per day, e.g. at 6 am and 6 pm, in order to download the data necessary for calculation.

Index and Data Reviews

Index composition, data collection and the code base are reviewed by a responsible index manager periodically two times per day.

Data Selection

Data retrieved from the exchanges is stored in a data base (e.g. MySQL). Before each calculation of CRIX index values, connections to the exchange APIs are established. For all possible constituents, asset name, date, volume, market cap and price is queried. In case of a connection error or failure to deliver the desired date, multiple (e.g. up to ten) retry attempts may be made after a short delay before each retry. After completing this step, another test may be run. In case of any missing values for relevant assets, another function may be run to attempt to retrieve all values from historical data. If this is successful, then the formerly missing data is imputed in the database. After the second step, one last test is performed: If any major crypto assets still miss data, then an error is raised that stops CRIX calculation until the error is resolved.

Data Storage

The data may be stored on a server (e.g. Plesk) and local (e.g. MySQL) database. Plesk is a commercial web hosting and server data center automation software with a control panel developed for Linux and Windows-based retail hosting service providers. Plesk's user management model is suitable for dedicated and shared hosting, allowing server administrators to set up new websites, reseller accounts, email accounts, and edit and create DNS entries through a web-based interface. Key features and solutions include the automation and management of domain names, email accounts, web applications, programming languages, databases, and infrastructure tasks to provide a ready-to-code environment and strong security across all layers and operating systems.

The foregoing describes a base framework. A fixed number of constituents may be used for a relatively stable market.

In one embodiment, the computer may be programmed using the R programming language, whereas in another embodiment, the computer may be programmed in the Python computer language, which is more modular in nature.

For use as an investment vehicle, the general concepts above may be adapted to provide for a more stable environment. For example, a dedicated parameter input set may be used, wherein the parameters are:

- 'coin_num': number of constituents. The Information Criterion (discussed below) is used to determine the number of constituents, unless coin_num is set to a specific integer value if it is desired to have a preset number of constituents (such as to prevent automatic jumps in constituents). In other embodiments, a range of the number of constituent having a floor and a ceiling may be used.

'ic': Information Criterion for coin_num selection, e.g 'AIC': Akaike Information Criterion, 'CTDC': CRIX Technology Decision Criterion. In other embodiments a different criteria can be used.

'oc': Order Criterion to determine coin list, e.g 'volume': take top coin_num coins ordered by volume_usd 'wm': Weighting Method for index, e.g 'market': market_cap_usd weighted average A database, such as an SQL database, may be used for capturing and retaining data used to create the index. The CRIX ecosystem thus provides a robust infrastructure, e.g. for the custodian to get the info on what CAs to hold/sell/buy.

Thus, a preferred embodiment includes stable and responsive data management of data collection, selection, storage, usage, and availability. The infrastructure may be coded to work reliably on a data cloud. The index may comprise a self-driving smart data processing and storage tool that is able to store and call on self-preprocessed data stored within its own ecosystem. A preferred embodiment is capable of operation with minimal to no human input, once running and provided with stable data streams from third party providers.

Figure 7:
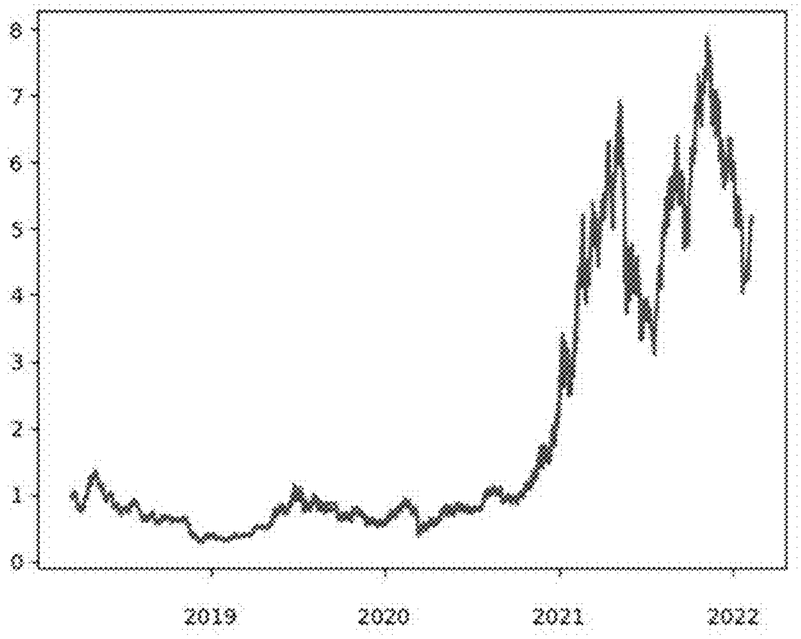
FIG. 7 is a graph depicting performance of an exemplary CRIX Index relative to the TMI.
Figure 8:
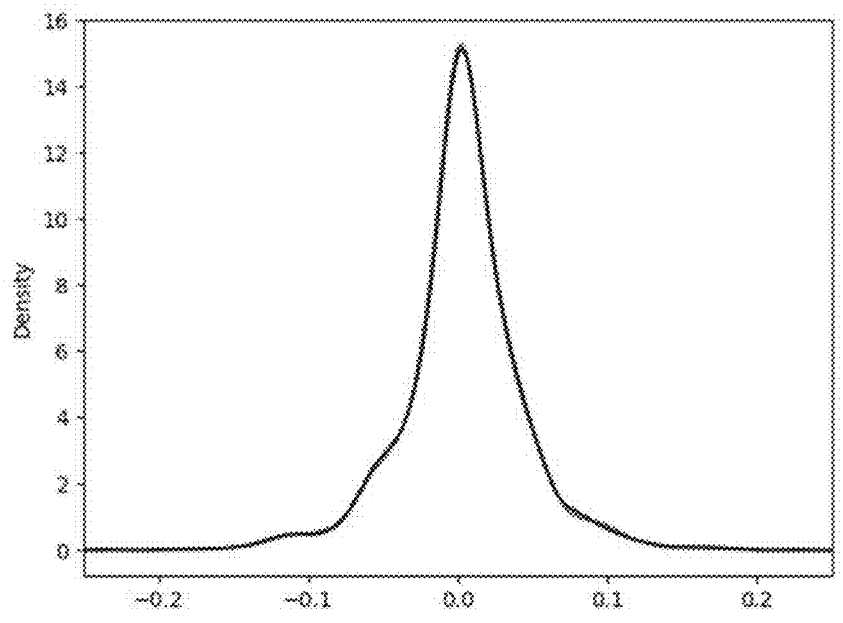
FIG. 8 depicts the probability density of returns of the CRIX index relative to the probability density returns of the TMI.
Figure 9:
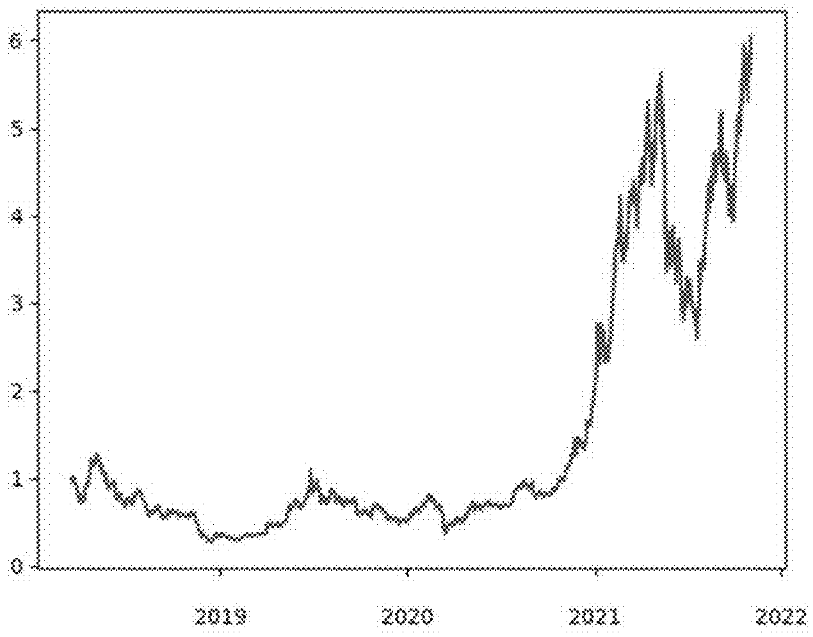
FIG. 9 depicts the CRIX index relative to the SP Broad Digital Index.
Figure 10:
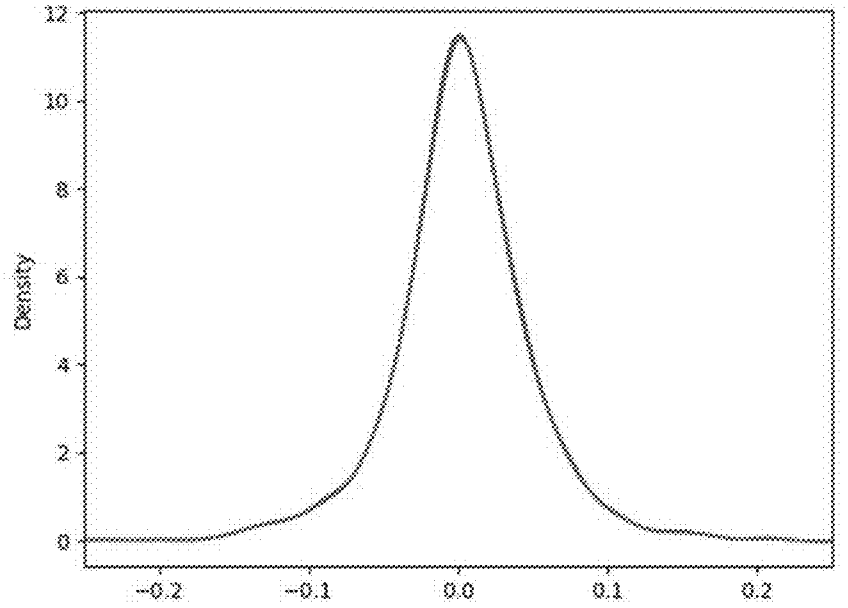
FIG. 10 depicts the respective probability density of returns for the CRIX index relative to the SP Broad Digital Index.

A preferred embodiment may have the following features:

1. Data collection for the index comprises technically calling and verifying information from different sources, such as data aggregators or exchanges, which can be set arbitrarily by user input. The index may be configured to choose the data to be used. In one embodiment, the data from the different sources may be compiled using a weighted average to mitigate any potential problems caused by third party data stream issues, or the data source to use may be set arbitrarily, with another source being used as a backup or to verify the data from the preferred source.
2. The data may be stored so as to be callable at any time from within the index infrastructure, thus enabling a stable system to also present historic data for verification. Data is stored between each step, e.g. after data collection and usage, i.e. after the data was handled and transformed. Errors resulting from third party issues can therefore remedied easily and assure a steady flow of information to the individual processing steps. The data can be stored locally but is intentionally set to be saveable to a cloud from where it shall be called. Yet, for the sake of increased data security, mechanisms for the data to be mirrored on cloud and local space are provided within the code.
3. Data usage, like the CTDC step—i.e. fitting via a polynomial to achieve a robust and stable selections algorithm for the number of constituents, see FIGS. 4 and 5—present essential data transformation processes set within the system. As the resulting data is different in between each step, due to the transformation being so rigorous, this underlines why the data storage steps in between are of such importance to guarantee a robust and verifiable system. The effectiveness of the proposed method is demonstrated in FIGS. 7-10. FIG. 7 depicts the performance of the CRIX Index superimposed over the TMI. It is evident that the CRIX tracks the TMI with an insignificant tracking error. This is further shown in FIG. 8, where the probability density of returns of the CRIX index are depicted superimposed over the probability density returns of the TMI. From the comparison of the returns it can be concluded that the CRIX Index manages to replicate the return structure of the total market. FIG. 9 depicts the CRIX index superimposed over the SP Broad Digital Index. The latter is an index which is calculated by S&P, consisting of more than 200 CA constituents. Again, the respective probability density of returns are depicted superimposed over one another in FIG. 10. Despite the large size of the SP Broad Digital Index, the two indices are almost perfectly correlated.
4. Data availability is assured to be available through the individual data lakes created in the data storage in between processing steps. This data is readily saved to be callable via e.g. an API structure.

The preferred embodiment thus presents an algorithmic index system for cryptocurrencies in which the index algorithm, the operation of which is variable based on values input by one or more data sources of various algorithm parameters, encoded and stored within a file structure as described. The index as described comprises a whole infrastructure and ecosystem with a robust determination of number of constituents and standardized index calculation.

The index as described herein may thus produce an index value that may be updated daily, and transmitted for use for tracking the CA market without having to compile information for the entire market on each trading day. The value thus transmitted may be displayed in print, on a display screen, or otherwise by one or more end users for any purpose. One purpose for use of the index may be to create an investment vehicle, such as an investment fund or an exchange traded fund (ETF) that tracks the index. Knowledge of the index value alone is not sufficient for the operator of the index fund to replicate with investments the actual performance of the index. Thus, the method may further comprise transmitting the underlying data including weightings of constituent funds to an investment operation computer processor.

The underlying data including weightings of constituent funds may then be used by an administrator or manager of an investment vehicle, such as an exchange traded fund, to accept investment from investors for shares of the fund, to purchase the constituent CAs in the weighted amounts represented by the index for each share, and to redeem one or more shares in exchange for equivalent value in a fiat currency, to provide the basket of CAs represented by the redeemed share to the redeemer, or some combination thereof. The administrator or manager of the investment vehicle may develop rules for purchase and redemption of shares to minimize transaction fees, as are known in the art. For example, redemptions requests may be matched to purchase requests when possible. Other rules may be employed, as are known in the art, to minimize volatility. Thus, investing steps may include issuing a plurality of shares in an index fund that follows the index as discussed herein, receiving funds from one or more investors for each share in the investment fund; and investing funds received from the one or more investors by purchasing the selected constituent CAs in amounts consistent with the selected weighting in the index. In some embodiments, a crypto asset corresponding to the index may be created.

Figure 6:
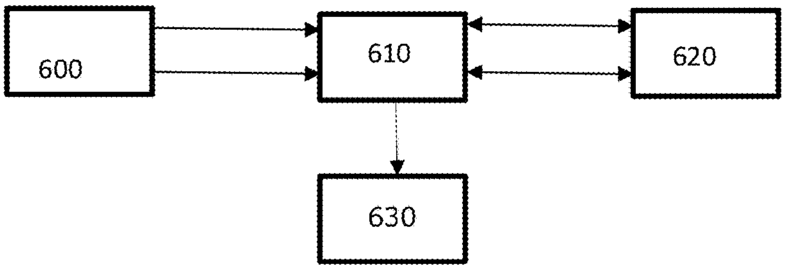
FIG. 6 schematically depicts an exemplary system embodiment of the present invention.

The method steps as described herein may be performed by a computer system configured to perform such steps. Referring now to FIG. 6, an exemplary such computer system comprises a processor 610 connected to an interface of each of the one or more predetermined data sources 600 and to a computer memory 620 structured to hold a database. The processor is configured to import data through the interface (via the arrows from sources 600 to processor 610) and is configured to transform the imported data in accordance with the method steps as described herein, and to store the transformed data in the database 620 after one or more of the data transformation steps. Processor 610 then periodically transmits or makes available for access by others in a select location in the database, the index fund value. The index fund value may be updated on a daily basis or, because the incoming data from the aggregators and exchanges is updated more frequently, and because the index tracks the total market using a much smaller number of constituent funds, may be updated on a more frequent than daily basis (e.g. hourly, every minute, every quarter-hour, etc.), without limitation. For those who wish to invest in the fund, processor 610 may make available data relating to the constituent CAs and weightings thereof, to permit an investor (e.g. via an investment vehicle management computer processor 630 that administers or manages a fund that tracks the index and that sells and redeems shares in the funds, and invests and divests the underlying constituent CAs in accordance with the number of shares and weightings) to replicate performance of the index. Making such investment data available may include also providing access to underlying historical and real-time data stored in the database, for verification by the investment vehicle manager or administrator.

Processor 610 may contain computer readable media programmed with language readable by the processor, for causing the processor to carry out the method steps as described. The computer media embodying the programmed steps in machine language may be any form of physical, non-transitory media known in the art, including flash media, disk media, optical media, or magnetic media, without limitation. Although referred to as a singular processor, it should be understood that the processor may comprise a plurality of processors located locally or accessible via a computer network, such as the internet, programmed to collectively perform the steps as indicated.

Applications beyond Crypto Assets Markets

Although discussed herein primarily in the context of managing an investible index for CAs and its advantages for use in a market such as the CA market, it should be understood that the methodology as described herein may be applied to managing any type of index relating to any type of asset. In particular, the methodology as described herein may be particularly useful for managing indices relating to emerging asset types in which the markets are still in a period of transition and unstable. The CRIX technology may also be used on another nascent and comparably illiquid markets with many potential constituents, such as but not limited to: the market of Voluntary Carbon Offset Credits, which are certified and registered carbon credits, trading either over-the-counter or on unregulated exchanges. In a similar fashion as for CAs, the return pattern of all investible and certified carbon credits can be taken and the corresponding TMI can be calculated. Subsequently, candidate indices composed of the largest and most liquid carbon credits can be developed and the CRIX methodology can be applied. Further applications include not only the market for non-fungible tokens, but also traditional markets with a wide range of constituents, such as a securities market, such as the stock market. For example, management of a market-capitalization-weighted index of the market value of selected stocks (e.g. American stocks actively traded in the United States), such as the Wilshire 5000 Total Market Index, can be simplified at great speed and condensed to the statistically significant constituents, be it on a daily or arbitrarily higher frequency. Dynamics of CRIX The statistical properties of the CRIX were illustrated for the period between Aug. 1, 2014, and Apr. 6, 2016. The majority of statistical forecasting methods for time series data rely on the stationarity assumption, which is the property of equal mean, variance, et cetera over time. However, CRIX violates the stationarity assumption, requiring the mathematical transformation of the data into a stationary time series through methods such as detrending and seasonal adjustment, for example. A very broad class of models that achieve these transformations are the Auto Regressive Integrated Moving Average (ARIMA) models, which were employed as a first step to the log returns of the CRIX to address the temporal dynamics of the time series. The Auto Regressive part of the model means that the time series values are regressed on its own lagged (past) values, the Moving Average part means that the regression errors are linear combinations of past regression errors, and the Integrated part refers to any kind of differencing transformations on the original data.

Fitting of an ARIMA model led to ARIMA (2,0,2) resulting in the best fit, signifying a lag order of the autoregressive model of 2, a degree of differencing of 0, and a lag order of the moving average model of 2. The well-known phenomenon of volatility clustering, in other words the tendency of changes of similar magnitude occurring together close in time, was observed in the residuals of the model.

To address this heteroscedasticity effect, a GARCH-model was additionally fitted to the residuals. The GARCH model assumes that the volatility at any given time point can depend on past volatilities and model residuals, which explicitly permits unequal variances over time. An ARIMA (2,0,2)-t-GARCH(1,1) model was found to have optimal fit, where the t stands for the additional assumption of student-t-distributed residuals, conveniently taking care of the fat-tail properties that occur frequently for financial markets.

Application of the ARIMA(2,0,2)-t-GARCH(1, 1) model that was found to have optimal fit can serve as an informative tool to aid practitioners in making financial decisions, for example in the pricing and hedging of derivative instruments.

VCRIX: A Volatility Index for Cryptos

Global measures of the volatility of a market, such as the Chicago Board Option Exchange's Volatility Index (VIX) or the VDAX, can serve as important signals for investors navigating the financial markets. These indices are constructed with the specific characteristics of their respective markets in mind to guarantee optimal fit to their purposes.

The cryptocurrency market has increasingly been attracting investor interest due to explosive returns and diversification opportunities. This surge of public interest necessitates the adoption of traditional financial tools to cryptocurrencies, such as the "fear index" VIX. The Volatility Cryptocurrency Index (VCRIX; Kim, Trimborn and Härdle, 2019) is the first volatility index implementation specifically optimized for the unique characteristics of the cryptocurrency market, such as high volatility and low liquidity. In order to provide a valid estimation of the future volatility, VCRIX is constituted of two main ingredients: estimation of the best suited proxy for implied volatility and selection of the statistical model exhibiting the most consistent predictive performance. For the choice of an adequate implied volatility proxy, the dynamics of the underlying need to be considered. VCRIX, similar to the traditional VIX, employs the rolling volatility method, which uses the daily returns of a specified time span to calculate an implied volatility estimate. Different statistical models were examined for their suitability for VCRIX, such as GARCH-family-models, the Heterogenous Auto-Regressive (HAR) model and a network based Long-Short-Term Memory Cell (LSTM) model. Generalized Autoregressive Conditional Heteroscedasticity (GARCH) models are frequently used models in the analysis of financial time series that allow for volatility clustering. Heterogenous Auto-Regressive models extend the classic AR-models to include volatilities over different time horizons. Long-Short-Term Memory Cell models are artificial recurrent neural network architectures that are used in deep learning to analyze sequences of data.

In the case of VCRIX, comparison of these models yielded superior predictive performance for the HAR model in spite of the relative simplicity of the model specification. The chosen model offered a very small MSE of 0.03 and a 99% correlation with the 30 day rolling volatility of CRIX log-returns. Additionally, a trading strategy based on VCRIX was shown to achieve impressive results, outperforming a benchmark strategy for 68% of the tested period.

In summary, VCRIX is an informative tool for investors that captures the volatility jumps inherent to the cryptocurrency ecosystem. The index visibly reflects historical events such as cryptocurrency-related government regulations in China, Korea, Japan and the US, or the debate on the SegWit (Segregated Witness) fork that aimed to improve the speed and cost of Bitcoin transactions. Additionally, the success of the proposed trading strategy based on VCRIX signals its practical use for practitioners, see FIG. 3.

Comparison of Cryptocurrency Indices

As there is no central authority that issues a cryptocurrency index, several research units and private companies have developed their own indices. Among them are Bitwise10 (issued by Bitwise Investments), Cryptocurrency Index 30 (CCi30, St. Andrews University), F5 crypto index (F5 Crypto Capital) and the Bloomberg Galaxy Cryptocurrency Index (BCGI), see FIG. 4.

Figure 4:
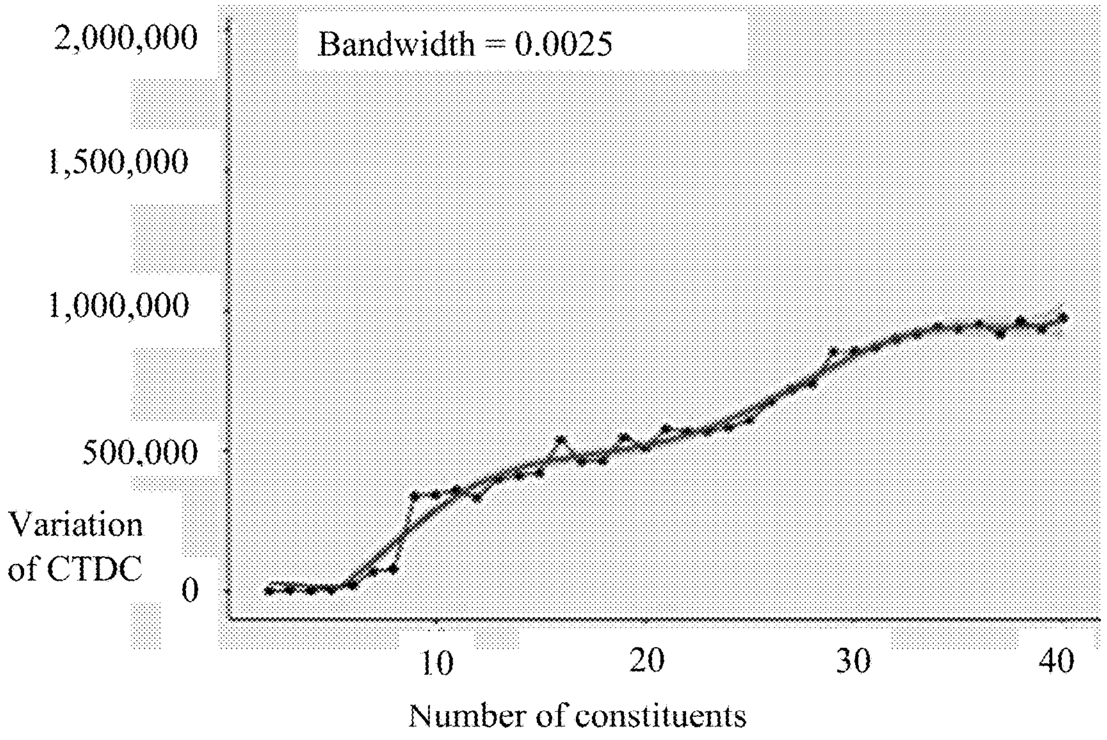
FIG. 4 is a graph depicting the CTDC variation showing a polynomial fit of the CTDC(k) over a time span of 1 Jan. 2021-27 Apr. 2021, analyzing the daily identification of constituents. The grey band reflects the variation over the indicated time span. The black line is one sample.
Figure 5:
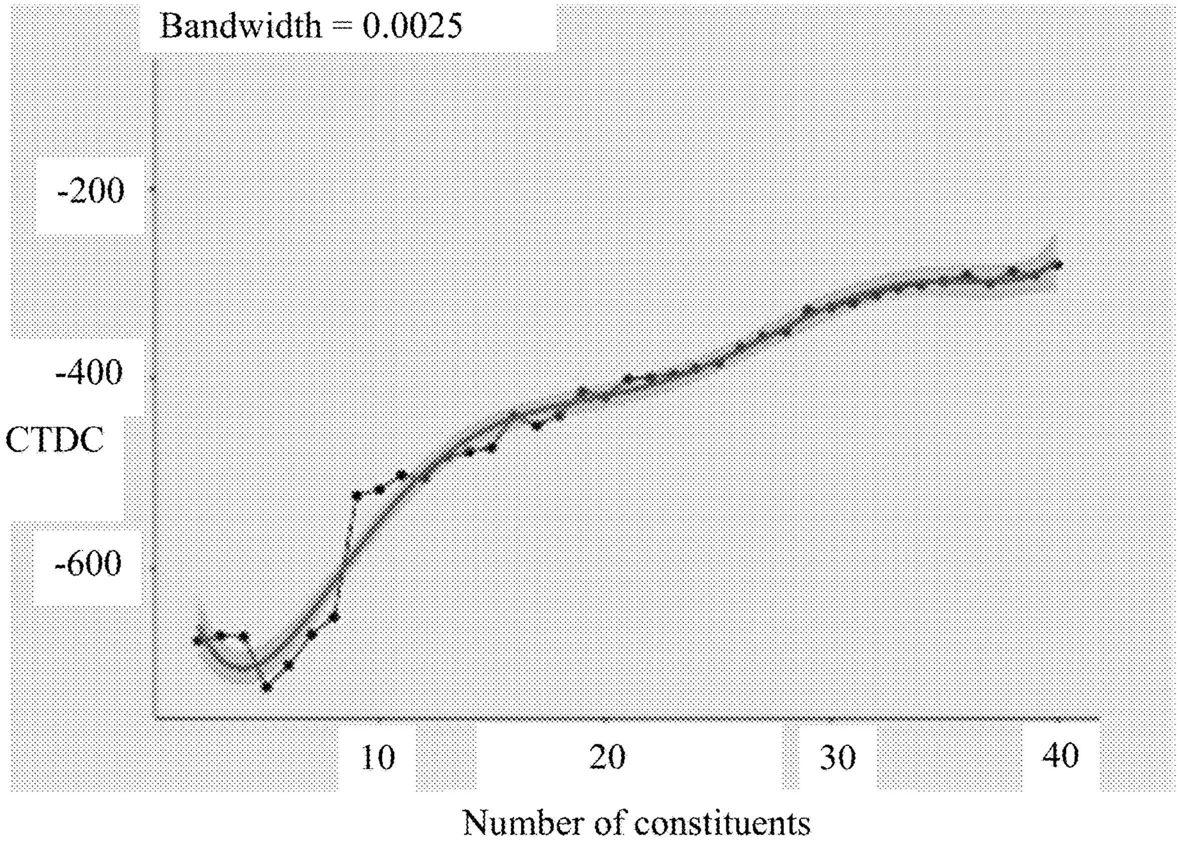
FIG. 5 is a graph depicting the Average CTDC showing a polynomial fit for the number k of constituent CAs for the timespan 1 Jan. 2021-27 Apr. 2021, indicating a "stable" minimum for the indicated time span.

FIG. 4 Comparison of Crypto Assets: CRIX, Bitwise10, CCI30, F5 Crypto, BGCI, TMI, 20180401-20200331.

A cryptocurrency index optimally represents most accurately the market dynamics of the crypto universe. The TMI is constructed by weighting each available coin by its market capitalization, i.e. it is a Laspeyre index of the complete market. The deviations of each index to the TMI are causes by methodological differences in the construction of the indices, especially the weighting of each constituent to the final index.

A plot of densities of correlation of various indices to the TMI obtained by bootstrapping samples of the index data, computing the correlation of each index to the TMI for each sample, and summarizing showed the CRIX and Bitwise 10 to have the highest correlation to the TMI, of the indices compared.

Table 1 presents descriptive statistics for each of the indices compared and their corresponding Sharpe Ratios and Probabilistic Sharpe Ratios (see Bailey and Lopez de Prado 2012). It is important to mention that the estimates of all moments are highly sensitive to the input data and the period of interest. In turn, this impacts significantly on the estimates of the Sharpe Ratios. The Probabilistic Sharpe Ratio overcomes this shortcoming by considering the confidence intervals of the estimated Sharpe Ratios, and thus takes into account the non-normality of the higher moments (note that skewness and kurtosis in the table below deviate significantly from the normal distribution). For the computation of the Sharpe Ratio, a risk-free rate of zero is assumed. The benchmark for the Probabilistic Sharpe Ratio is set to zero as well, thereby it is possible to interpret the last column as the probability that the Sharpe Ratios are bigger than zero.

| | Sharpe Ratio | mean return | variance of returns | skewness | kurtosis | Probabilistic Sharpe Ratio |
|---|---|---|---|---|---|---|
| BGCI | 0.005 | 0.02% | 0.043 | −0.225 | 9.004 | 0.549 |
| Bitwise10 | 0.026 | 0.10% | 0.040 | −0.190 | 8.046 | 0.735 |
| CRIX | 0.039 | 0.15% | 0.040 | −0.092 | 15.223 | 0.828 |
| CCi30 | 0.016 | 0.06% | 0.042 | −0.123 | 8.811 | 0.651 |
| F5 crypto | 0.018 | 0.08% | 0.046 | −0.993 | 13.928 | 0.670 |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A computer-implemented method of managing an investible asset investment fund based upon a selected investment index (CRIX) that tracks a subset of selected component eligible assets (EAs) within a desired tracking error of a total market index (TMI) of candidate EAs, each EA comprising an emerging asset type in a market that is unstable, the method comprising the steps of:

(a) identifying a universe of candidate EAs available for investment for which trading data from one or more exchanges is available from one or more predetermined data sources, and storing the trading data in computer memory in a database;

(b) filtering, using the computer processor, the universe of candidate EAs using one or more liquidity criteria and one or more reputability criteria to define a set of qualified EAs meeting the one or more liquidity criteria and the one or more reputability criteria;

(c) ranking, using the computer processor, the set of qualified EAs from most market capitalization to least market capitalization to define a list of ranked qualified EAs;

(d) constructing, using the computer processor, the TMI at a time t; and (e) using the computer processor programmed with formulae $$CRIX_t = \frac{MV_{i,t}}{\text{Divisor}_t} \quad [2]$$

$$\text{Divisor}_0 = \frac{\sum_i MV_{i0}}{1000} \quad [3]$$

$$\frac{MV_{i,t-1}}{\text{Divisor}_{t-1}} = \text{INDEX}_{t-1}^{CRIX} = \text{INDEX}_t^{CRIX} = \frac{MV_{i,t}}{\text{Divisor}_t} \quad [4]$$

$$CRIX(k)_t = \frac{\sum_i^k MV_{it} \cdot AW_{it}}{\text{Divisor}} \quad [5]$$

$$AW_{it} = \frac{CW_{it}}{W_{it}} \quad [6]$$

$$W_{it} = \frac{MV_{it}}{\sum_i MV_{it}} \quad [7]$$

wherein:

$\text{CRIX}_t$ is a value of the index at a time t, $\text{MV}_{i,t}$ is market capitalization of each index EA i at time t, Divisor is an adjustable value that changes to ensure changes in the CRIX index are caused solely by price changes, wherein $Divisor_t$ is the Divisor value before a change in a number of index EAs and $Divisor_{t-1}$ is the Divisor directly afterwards;

$W_{it}$ is a calculated weight for each index EA i at time t;

$CW_{it}$ is a capped weight for each index EA i at time t, calculated to avoid an affected index EA having an influence of 50% or more in the CRIX;

$AW_{it}$ is an asset weight for each index EA i at time t;

iteratively constructing a plurality of candidate indices for an increasing number of index EAs selected from the list of ranked, qualified EAs, starting with a first block of the n highest ranked qualified EAs in a first iteration, and adding a next n highest ranked qualified EA in each successive iteration, and for each iteratively-generated candidate index (CRIX(k)), each having different numbers of index EAs that fulfil $k_1<k_2<k_3 \ldots kmax$, and generating a decision curve, wherein generating the decision curve comprises the substeps of (i) computing a difference between index log-returns of the TMI and each candidate index;

(ii) computing a kernel density estimation for density, with leave-one-out cross validation using formula $$f(\hat{\varepsilon}(k_i, \beta)_t) \text{ and } f(\hat{\varepsilon}(k_1, 1)_t) \quad [13]$$

(iii) deriving an Akaike information criterion (AIC) value using formulae $$AIC(k_i, \beta, s) = -2\log\prod_{t=1}^{n} f(\hat{\varepsilon}(k_i, \beta)_t) + 2s \text{ and } AIC(k_1, 1, 0) \quad [14]$$

$$TMI_t(k_{max}) = \frac{\sum_{i=1}^{k_{max}} MV_{i,t}}{\text{Divisor}} \quad [15]$$

$$\beta_{i,t} = \frac{Vol_{i,t}}{MV_{i,t}} \quad [16]$$

$$s \in [0, k_{max} - k_1] \quad [17]$$

(iv) fitting a polynomial to the AIC value over a predetermined time period, wherein:

$k_{max}$ is a maximum number of index EAs with available prices; and the polynomial fitted to the AIC value over the predetermined time period has a degree corresponding to the number of index EAs in a range of one to twenty, (f) selecting as an investment index from the plurality of candidate indices, the selected investment index having a least number of index EAs corresponding to the degree of the polynomial that minimizes the AIC relative to other candidate indices, the selected investment index having selected component EAs each having a selected weighting, and using the selected investment index with the selected component EAs for a first period Q and with the selected weighting for a second period M, wherein M<Q;

(g) rebalancing weighting of the selected component EAs in the selected investment index periodically each period M;

(h) re-performing steps d-f periodically each period Q to select a new selected investment index;

(i) periodically calculating an index value based upon the investment index, and transmitting the index value and data regarding the selected component EAs and the selected weighting to an investment vehicle management computer processor associated with an investment vehicle;

further comprising the steps of:

storing in the database data associated with each term, variable, and result referenced in the formulae corresponding to each of steps (d), (e)(i), (e)(ii), (e)(iii), (e)(iv), and (f); and retrieving stored data from the database for use in a subsequent performance of each of steps (d), (e)(i), (e)(ii), (e)(iii), (e)(iv), and (f);

wherein performing step (f) minimizes the number of selected component EAs in the subset comprising the selected investment index that tracks the TMI within the desired tracking error.

2. The method of claim 1, wherein the candidate EAs comprise cryptocurrency assets.

3. The method of claim 2, wherein step (e) further comprises the substeps of:

(v) issuing a plurality of shares in the investment vehicle;

(vi) receiving investment from one or more investors for each share in the investment vehicle; and (vii) investing the investment received from the one or more investors by purchasing the selected component EAs in amounts consistent with the selected weighting.

4. The method of claim 2, wherein the one or more predetermined data sources comprise a plurality of selected aggregators or exchanges.

5. The method of claim 4, wherein one or more of the plurality of selected aggregators or exchanges is selected from the group consisting of aggregators CoinGecko and CoinMarketCap, and exchanges Gemini, Kraken, iBitt, Bitstem, and Coinbase.

6. The method of claim 4, wherein the plurality of selected aggregators or exchanges comprise five aggregators or exchanges.

7. The method of claim 1, wherein the reputability criteria includes the qualified EA being active in one or more tradable markets listed on at least three of the exchanges for an entire period since a previous index reconstitution.

8. The method of claim 4, wherein the liquidity criteria includes the qualified EA having an average daily trading volume in a United States Dollar (USD) pair conducted across the plurality of exchanges above the 25th percentile of the average daily trading volume distribution of all assets traded in the plurality of exchanges.

9. The method of claim 1, wherein the liquidity criteria includes the qualified EA having free-floating pricing not pegged to a value of any other asset.

10. The method of claim 1, further comprising retrieving the stored data from the database in each of steps (d), (e)(i), (e)(ii), (e)(iii), (e)(iv), and (f) using an application programming interface (API).

11. The method of claim 1, wherein the step of fitting a polynomial to the AIC constructed in step (e)(iii) over the predetermined time period comprises approximating daily AIC values of a prior 6 months using the polynomial.

12. The method of claim 1, wherein the candidate EAs comprise carbon offset credits.

13. The method of claim 1, wherein the candidate EAs comprise non-fungible tokens.

14. The method of claim 1, wherein the candidate EAs comprise securities.

15. A computer system comprising a processor connected to an interface of each of one or more predetermined data sources and to a computer memory structured to hold a database, the processor configured to:

import data via the interface, transform the imported data by performing data transformation steps including:

(a) identifying a universe of candidate eligible assets (EAs) available for investment for which trading data is available from one or more predetermined data sources, each candidate EA comprising an emerging asset type in a market that is unstable;

(b) filtering, using the computer processor, the universe of candidate EAs using one or more liquidity criteria and one or more reputability criteria to define a set of qualified EAs meeting the liquidity criteria and the reputability criteria;

(c) ranking, using the computer processor, the set of qualified EAs from most market capitalization to least market capitalization to define a list of ranked, qualified EAs;

(d) constructing, using the computer processor, the TMI at a time t; and (e) using the computer processor programmed with formulae $$CRIX_t = \frac{MV_{i,t}}{\text{Divisor}_t} \quad [2]$$

$$\text{Divisor}_0 = \frac{\sum_i MV_{i0}}{1000} \quad [3]$$

$$\frac{MV_{i,t-1}}{\text{Divisor}_{t-1}} = \text{INDEX}_{t-1}^{CRIX} = \text{INDEX}_t^{CRIX} = \frac{MV_{i,t}}{\text{Divisor}_t} \quad [4]$$

$$CRIX(k)_t = \frac{\sum_i^k MV_{it} \cdot AW_{it}}{\text{Divisor}} \quad [5]$$

$$AW_{it} = \frac{CW_{it}}{W_{it}} \quad [6]$$

$$W_{it} = \frac{MV_{it}}{\sum_i MV_{it}} \quad [7]$$

and wherein:

$CRIX_t$ is a value of the index at a time t, $MV_{i,t}$ is market capitalization of each index EA i at time t, Divisor is an adjustable value that changes to ensure changes in the CRIX index are caused solely by price changes, wherein $\text{Divisor}_t$ is the Divisor value before a change in an amount of index EAs and $\text{Divisor}_{t-1}$ is the Divisor directly afterwards;

$W_{it}$ is a calculated weight for each index EA i at time t;

$CW_{it}$ is a capped weight for each index EA i at time t, calculated to avoid an affected EA having an influence of 50% or more in the CRIX;

$AW_{it}$ is an asset weight for each index EA i at time t;

iteratively constructing a plurality of candidate indices for an increasing number of index EAs selected from the list of ranked, qualified EAs, starting with a first block of the n highest ranked qualified EA in a first iteration, and adding a next n highest ranked qualified EA in each successive iteration, and for each iteratively-generated candidate index CRIX(k)), each having different numbers of index EAs that fulfil $k_1<k_2<k_3 \ldots$ kmax, and generating a decision curve, wherein generating the decision curve comprises the substeps of:

(i) computing a difference between index log-returns of the TMI and the candidate index;

(ii) computing a kernel density estimation for density, with leave-one-out cross validation using formula $$f(\hat{E}(k_i, \beta)_t \text{ and } f(\hat{E}(k_1, 1)_t \quad [13]$$

(iii) deriving an Akaike information criterion (AIC) value using formulae $$AIC(k_i, \beta, s) = -2\log\prod_{t=1}^{n} f(\hat{\varepsilon}(k_i, \beta)_t) + 2s \text{ and } AIC(k_1, 1, 0) \quad [14]$$

$$TMI_t(k_{max}) = \frac{\sum_{i=1}^{k_{max}} MV_{i,t}}{\text{Divisor}} \quad [15]$$

$$\beta_{i,t} = \frac{Vol_{i,t}}{MV_{i,t}} \quad [16]$$

$$s \in [0, k_{max} - k_1] \quad [17]$$

(iv) fitting a polynomial to the AIC value over a predetermined time period;

wherein:

$k_{max}$ is a maximum number of index EAs with available prices; and the polynomial fitted to the AIC value over the predetermined time period has a degree corresponding to the number of index EAs in a range of one to twenty;

(f) selecting as an investment index from the plurality of candidate indices, the selected investment index having a least number of index EAs corresponding to the degree of the polynomial that minimizes the AIC relative to other candidate indices, the selected investment index having selected component EAs each having a selected weighting, and using the selected investment index with the selected component EAs for a first period Q and with the selected weighting for a second period M, wherein M<Q;

(g) rebalancing weighting of the selected component EAs in the selected investment index periodically each period M;

(h) re-performing steps (d)-(f) periodically each period Q to select a new selected investment index;

(i) periodically calculating an index value based upon the selected investment index, and transmitting the index value and data regarding the selected component EAs and the selected weighting to an investment vehicle management computer processor associated with an investment vehicle, and store the transformed data in the database after each of the data transformation steps (d), (e)(i), (e)(ii), (e)(iii), (e)(iv), and (f); and retrieve the stored data from the database for use in subsequent performance of each of steps (d), (e)(i), (e)(ii), (e)(iii), (e)(iv), and (f);

wherein the configuration of the processor to perform step (f) minimizes the number of selected component EAs in a subset that defines the selected investment index capable of tracking a total market index (TMI) of EAs within a desired tracking error.

16. The computer system of claim 15, further comprising an investment vehicle computer processor configured to issue a plurality of shares in the investment vehicle, receive investment from one or more investors for each share in the investment vehicle, and invest the investment received from the one or more investors by purchasing the selected component EAs in amounts consistent with the selected weighting.

17. The computer system of claim 15, wherein the processor is configured to import the data in periodic batches, each batch having a size confined to conform to a memory limit of the computer memory.

18. A non-transitory computer readable media programmed with language readable by a computer processor, for causing the processor to perform data transformation steps including:

a. identifying a universe of candidate eligible assets (EAs) available for investment for which trading data is available from one or more predetermined data sources, each candidate EA comprising an emerging asset type in a market that is unstable;

b. filtering, using the computer processor, the universe of candidate EAs using one or more liquidity criteria and one or more reputability criteria to define a set of qualified EAs meeting the liquidity criteria and the reputability criteria;

c. ranking, using the computer processor, the set of qualified EAs from most market capitalization to least market capitalization to define a list of ranked, qualified EAs;

d. constructing, using the computer processor, the TMI at a time t; and e. using the computer processor programmed with formulae $$CRIX_t = \frac{MV_{i,t}}{\text{Divisor}_t} \quad [2]$$

$$\text{Divisor}_0 = \frac{\sum_i MV_{i0}}{1000} \quad [3]$$

$$\frac{MV_{i,t-1}}{\text{Divisor}_{t-1}} = \text{INDEX}_{t-1}^{CRIX} = \text{INDEX}_t^{CRIX} = \frac{MV_{i,t}}{\text{Divisor}_t} \quad [4]$$

$$CRIX(k)_t = \frac{\sum_i^k MV_{it} \cdot AW_{it}}{\text{Divisor}} \quad [5]$$

$$AW_{it} = \frac{CW_{it}}{W_{it}} \quad [6]$$

$$W_{it} = \frac{MV_{it}}{\sum_i MV_{it}} \quad [7]$$

wherein:

$CRIX_t$ is a value of the index at a time t, $MV_{i,t}$ is market capitalization of each index EA i at time t, Divisor is an adjustable value that changes to ensure changes in the CRIX index are caused solely by price changes, wherein $\text{Divisor}_t$ is the Divisor value before a change in an amount of index EAs and $\text{Divisor}_{t-1}$ is the Divisor directly afterwards;

$W_{it}$ is a calculated weight for each index EA i at time t;

$CW_{it}$ is a capped weight for each index EA i at time t, calculated to avoid an affected qualified EA having an influence of 50% or more in the CRIX;

$AW_{it}$ is an asset weight for each index EA i at time t;

iteratively constructing a plurality of candidate indices for an increasing number of index EAs selected from the list of ranked, qualified EAs, starting with a first block of the n highest ranked qualified EAs in a first iteration, and adding a next n highest ranked qualified EAs in each successive iteration, and for each iteratively-generated candidate index CRIX(k)), each having different numbers of index EAs that fulfill $k_1 < k_2 < k_3 \ldots kmax$, generating a decision curve, wherein generating the decision curve comprises the subsets of:

i. computing a difference between index log-returns of the TMI and the candidate index;

ii. computing a kernel density estimation for density, with leave-one-out cross validation using formula $$f(\hat{\varepsilon}(k_i, \beta)_t) \text{ and } f(\hat{\varepsilon}(k_1, 1)_t) \quad [13]$$

iii. deriving an Akaike information criterion (AIC) value using formulae $$AIC(k_i, \beta, s) = -2\log\prod_{t=1}^{n} f(\hat{\varepsilon}(k_i, \beta)_t) + 2s \text{ and } AIC(k_1, 1, 0) \quad [14]$$

$$TMI_t(k_{max}) = \frac{\sum_{i=1}^{k_{max}} MV_{i,t}}{\text{Divisor}} \quad [15]$$

$$\beta_{i,t} = \frac{Vol_{i,t}}{MV_{i,t}} \quad [16]$$

$$s \in [0, k_{max} - k_1] \quad [17]$$

iv. fitting a polynomial to the AIC value over a predetermined time period, wherein:

$k_{max}$ is a maximum number of index EAs with available prices; and the polynomial fitted to the AIC value over the predetermined time period has a degree corresponding to a number of index EAs in a range of one to twenty, f. selecting as an investment index from the plurality of candidate indices, the selected index having a least number of index EAs corresponding to the degree of the polynomial that minimizes the AIC relative to other candidate indices, the selected investment index having selected component EAs each having a selected weighting, and using the selected investment index with the selected component EAs for a first period Q and with the selected weighting for a second period M, wherein M<Q;

g. rebalancing weighting of the selected component EAs in the investment index periodically each period M;

h. re-performing steps d-f periodically each period Q to select a new selected investment index;

i. periodically calculating an index value based upon the selected investment index, and transmitting the index value and data regarding the selected component EAs and the selected weighting to an investment vehicle management computer processor associated with an investment vehicle;

further comprising the steps of:

storing in a database in computer memory, data associated with each term, variable, and result referenced in the formulae corresponding to each of steps (d), (e)(i), (e)(ii), (e)(iii), (e)(iv), and (f); and retrieving the stored data from the database for use in subsequent performance of each of steps (d), (e)(i), (e)(ii), (e)(iii), (e)(iv), and (f);

wherein the language readable by the computer processor for causing the processor perform step (f) minimizes the number of selected component EAs in a subset that defines the selected investment index capable of tracking a total market index (TMI) of EAs within a desired tracking error.

* * * * *